United States Patent
Schuh et al.

(10) Patent No.: US 9,780,373 B2
(45) Date of Patent: Oct. 3, 2017

(54) STORAGE STRUCTURE FOR A SOLID ELECTROLYTE BATTERY

(71) Applicant: SIEMENS AKTIENGESELLSCHAFT, München (DE)

(72) Inventors: Carsten Schuh, Baldham (DE); Thomas Soller, Deggendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/895,564

(22) PCT Filed: May 16, 2014

(86) PCT No.: PCT/EP2014/060041
§ 371 (c)(1),
(2) Date: Dec. 3, 2015

(87) PCT Pub. No.: WO2014/195111
PCT Pub. Date: Dec. 11, 2014

(65) Prior Publication Data
US 2016/0126552 A1    May 5, 2016

(30) Foreign Application Priority Data

Jun. 4, 2013 (DE) .................. 10 2013 210 342

(51) Int. Cl.
*H01M 4/62* (2006.01)
*H01M 4/52* (2010.01)
(Continued)

(52) U.S. Cl.
CPC ............ *H01M 4/62* (2013.01); *C01B 3/001* (2013.01); *C01B 3/0026* (2013.01); *H01M 4/38* (2013.01);
(Continued)

(58) Field of Classification Search
CPC ...................................................... H01M 4/38
See application file for complete search history.

(56) References Cited

U.S. PATENT DOCUMENTS

| 2008/0089834 A1 | 4/2008 | Kodama et al. |
| 2014/0205918 A1 | 7/2014 | Schuh et al. |
| 2014/0220447 A1 | 8/2014 | Benkert et al. |

FOREIGN PATENT DOCUMENTS

| DE | 102011017711 A1 | 10/2012 |
| DE | 102011083538 A1 | 3/2013 |

(Continued)

OTHER PUBLICATIONS

R. Amir et al.; "Design Development of Iron Solid Reactants in the UT-3 Water Decomposition Cycle Based on Ceramic Support Materials", International Journal of Hydrogen Energy, vol. 18, No. 4, 1993, pp. 283-286.

(Continued)

*Primary Examiner* — Peter F Godenschwager
(74) *Attorney, Agent, or Firm* — Slayden Grubert Beard PLLC

(57) ABSTRACT

A storage medium and an inert material, either integrated into the storage medium or existing as a separate phase in the storage medium, form a storage structure. The inert material at least partially contains or is formed by a polymorphous inert material. The polymorphous inert material has at least one polymorphous phase transition in the range between ambient temperature and maximum operating temperature of the solid electrolyte battery. The polymorphous phase transition induces a distortion of the lattice structure of the inert material, thus causing a change in the specific volume and acting on the surrounding grains of the storage medium. A mechanical coupling of the stresses triggered by the phase transition of the inert material causes the neighboring grains of the storage medium to break apart, such that new reactive (Continued)

zones become available in the storage medium, thereby regenerating the solid electrolyte battery.

9 Claims, 3 Drawing Sheets

(51) Int. Cl.
  *H01M 4/38*  (2006.01)
  *H01M 8/0606*  (2016.01)
  *H01M 8/1253*  (2016.01)
  *H01M 8/18*  (2006.01)
  *C01B 3/00*  (2006.01)
  *H01M 4/48*  (2010.01)
  *H01M 8/124*  (2016.01)
  *H01M 4/02*  (2006.01)

(52) U.S. Cl.
  CPC ............ *H01M 4/48* (2013.01); *H01M 4/523* (2013.01); *H01M 8/0606* (2013.01); *H01M 8/1253* (2013.01); *H01M 8/18* (2013.01); *H01M 2004/027* (2013.01); *H01M 2008/1293* (2013.01); *H01M 2300/0077* (2013.01); *Y02E 60/327* (2013.01); *Y02E 60/36* (2013.01); *Y02E 60/525* (2013.01); *Y02E 60/528* (2013.01); *Y02P 70/56* (2015.11)

(56) References Cited

FOREIGN PATENT DOCUMENTS

| DE | 102011083545 A1 | 3/2013 |
|---|---|---|
| DE | 102011084181 A1 | 3/2013 |
| DE | 102011085224 A1 | 3/2013 |
| DE | 102013210342.5 | 6/2013 |
| WO | 2008/019926 A1 | 2/2008 |
| WO | 2011/019455 A1 | 2/2011 |
| WO | PCT/EP2014/060041 | 5/2014 |

OTHER PUBLICATIONS

German Office Action for Appln No. 102013210342.5 dated Feb. 6, 2014.
International Search Report for PCT/EP2014/060041 mailed Jul. 23, 2014.

STORAGE STRUCTURE FOR A SOLID ELECTROLYTE BATTERY

CROSS REFERENCE TO RELATED APPLICATIONS

This application is the U.S. national stage of International Application No. PCT/EP2014/060041, filed, May 16, 2014 and claims the benefit thereof. The International Application claims the benefit of German Application No. 102013210342.5 filed on Jun. 4, 2013, both applications are incorporated by reference herein in their entirety.

BACKGROUND

Described below is a storage structure for a solid electrolyte battery.

Solid electrolyte batteries are based on the operating principle of solid electrolyte fuel cells, which are extended by additional provision of at least one storage element to give a solid electrolyte battery.

Known solid electrolyte fuel cells of the generic type, for example oxide-ceramic fuel cells, also referred to in the specialist field as SOFC (solid oxide fuel cells), are known from international published specification WO 2011/019455 A1, in which the concept of SOFC-derived solid electrolyte batteries is addressed in detail. Solid electrolyte batteries of this kind work with an operating temperature above 500° C., at which the solid electrolyte has sufficient ion conductivity for oxygen ions.

A storage medium intended for operation of a rechargeable solid electrolyte battery typically includes particles suitable for formation of a redox pair as a constituent of at least one storage element of the solid electrolyte battery. The particles are typically formed of metal and/or metal oxide. According to the battery state (charging or discharging), this storage medium is reduced or oxidized. The storage structure typically has a gas-permeable porous microstructure, i.e. a skeleton-like structure of the storage medium with high open porosity.

In a multitude of cyclical charging and discharging operations, i.e. reduction and oxidation operations, of the storage medium, the storage medium at the high operating temperatures applied has a tendency to coarsening and/or sintering of the particles of the active storage medium. This leads to a continuous change in the storage structure and especially to a decrease in the surface area of the storage medium, which is reflected in increasingly poorer charging and discharging characteristics and in a decrease in the useful capacity.

There have therefore already been proposals of storage structures using storage media based on oxide dispersion-strengthened particles (ODS) particles. Such a storage structure features more prolonged stability, which corresponds to a higher achievable number of cycles of charging and discharging operations without any significant losses in useful capacity. Additionally known is use of a ceramic matrix which forms an intergranular (i.e. between the particles of the storage medium) support skeleton to space apart the particles of the storage medium.

Both dispersion strengthening of the particles of the storage medium and a coarse-grained ceramic matrix slow down coarsening of the particles of the storage medium, but cannot reverse it. More particularly, it is not possible at present to regenerate an aged storage structure to the effect that particle coarsening of the storage medium is reversed.

SUMMARY

The storage structure includes a storage medium and an inert material integrated in the storage medium or present as a separate phase in the storage medium, wherein the inert material contains or is formed at least in part by a portion of a polymorphous inert material. The polymorphous inert material has at least one polymorphous phase transition within the range between room temperature and the maximum use temperature of the solid electrolyte battery.

The polymorphous phase transition brings about a change in the lattice structure and the specific volume of the inert material, which also affects the surrounding grains of the storage medium by acting on them. Mechanical coupling of the change in volume triggered by the phase transition of the inert material leads to tensions in the environment of the inert material and thus causes the adjacent grains of the storage medium to break up, thus providing new reactive zones of the storage medium. Thus, regeneration of the solid electrolyte battery is achieved.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
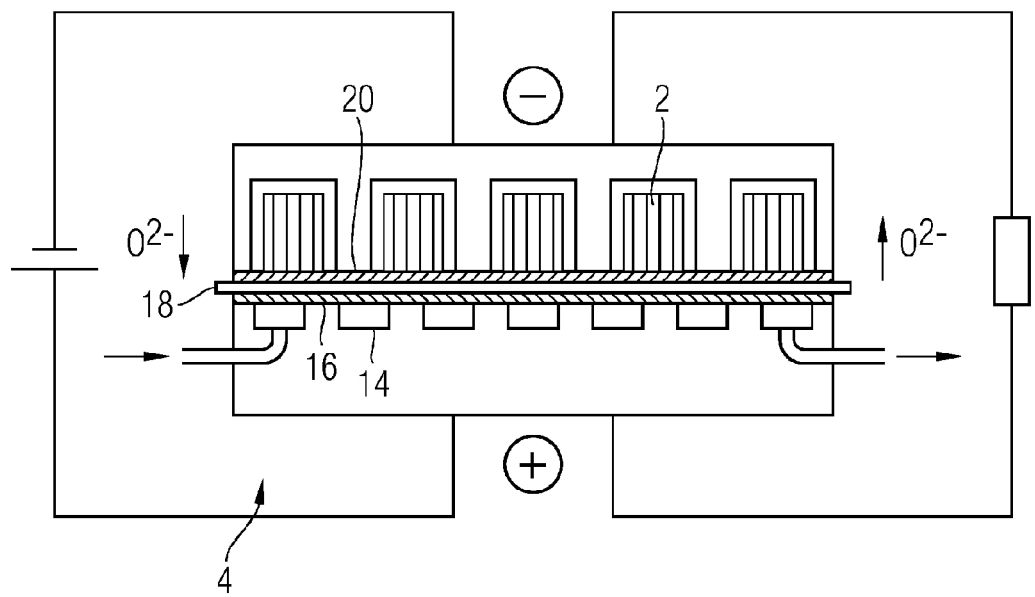
FIG. 1 is a schematic diagram of an illustrative setup and a mode of operation of a solid electrolyte battery.

Reference will now be made in detail to the preferred embodiments, examples of which are illustrated in the accompanying drawings, wherein like reference numerals refer to like elements throughout.

The figures, for the benefit of an informative representation, are not necessarily drawn true to scale; more particularly, the size ratios of the figure elements shown—both in themselves and relation to one another—do not necessarily correspond to reality.

FIG. 1 shows an illustrative structure diagram for representation of a mode of operation of a solid electrolyte battery, to the extent necessary for the description of the present invention. Because of the schematic representation, therefore, not all components of such a solid electrolyte battery are illustrated.

A mode of operation of a solid electrolyte battery includes supplying a process gas, especially air, via a gas supply 14 at a positive electrode—arranged at the bottom in the drawing and symbolized by a circled plus sign—which is also referred to as air electrode 16, and removal of oxygen from the air in the course of discharge—according to a circuit shown on the right-hand side of the picture. The oxygen passes in the form of oxygen ions $O^{2-}$ through a solid electrolyte 18 adjoining the positive electrode to a negative electrode 20—arranged at the top in the drawing and symbolized by a circled minus sign—which is also referred to as a storage electrode. The latter is connected via a gaseous redox pair, for example a hydrogen-water vapor mixture, to a porous storage structure 2.

If an impervious layer of the active storage medium were to be present at the negative electrode 20, the charge capacity of the solid electrolyte battery would be rapidly exhausted. For this reason, it is appropriate to use a storage structure 2 composed of porous material and containing a functional oxidizable material as storage medium, such as metal or metal oxide, for example iron and iron oxide and/or nickel and nickel oxide, as storage medium at the negative electrode 20.

A redox pair which is gaseous in the operating state of the battery, for example a mixture of $H_2/H_2O$, transports oxygen ions through the solid-state electrolyte 18, after they have been discharged at the negative electrode, in the form of water vapor through pore channels in the porous storage structure 2 of the active storage medium. According to whether a discharging or charging operation is in progress, the metal or metal oxide is oxidized or reduced and the oxygen required for the purpose is provided by the gaseous redox pair $H_2/H_2O$ or transported back to the solid-state electrolyte 18 or to the negative electrode 20. This mechanism of oxygen transport via a gaseous redox pair is also referred to as the shuttle mechanism.

The diffusion of the oxygen ions through the solid electrolyte 18 requires a high operating temperature of 600 to 900° C. in the solid electrolyte battery described. The operating temperature range is additionally advantageous for an optimal composition of the gaseous redox pair $H_2/H_2O$ in equilibrium with the storage medium. At such an operating temperature, not only are the electrodes 16 and 20 and the electrolyte 18 subjected to high thermal stress, but also the storage structure 2 of the storage medium. In the constant cycles of oxidation and reduction, the active storage medium has a tendency to sinter and/or to coarsen.

Sintering means that individual grains increasingly fuse to one another as a result of diffusion processes, with a disadvantageous decrease both in the reactive surface area and in the completely open pore structure which is required for the gas transport.

Coarsening means that individual grains grow at the expense of other grains, with a disadvantageous decrease in the numerical density and reactive surfaces of the grains.

In a closed pore structure, the redox pair $H_2/H_2O$ is no longer able to reach the active surface area of the active storage medium, and so, after only a partial discharge of the storage medium, the internal resistance of the battery becomes very high, which prevents any further technically viable discharge.

Figure 2:
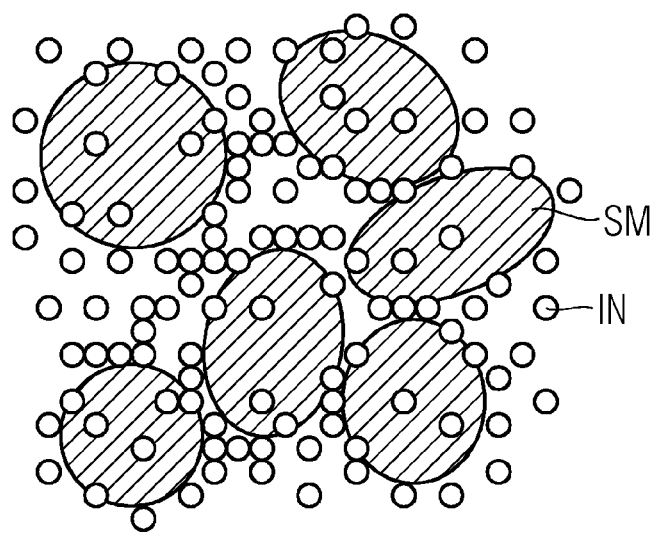
FIG. 2 is a schematic diagram of a storage structure of the solid electrolyte battery.

FIG. 2 shows a significantly enlarged representation of a microstructure of the storage structure used in a solid electrolyte battery.

The storage structure is formed essentially by the redox-active storage medium SM and inert material IN. The storage medium SM is in principle present in any desired grain form. The schematic representation of the drawing shows, by way of example, large oval grain cross sections.

Pores are present between the grains of the storage medium SM.

By virtue of the open porosity formed, shuttle gas, especially $H_2/H_2O$, is able to flow in the desired manner through the storage structure. A charging or discharging process brings about a reduction or oxidation of the grains of the active storage medium SM, the oxidation state of which increases during the oxidation and decreases again in the course of reduction. Oxidation and reduction processes are associated with a constant change in volume of the grains of the active storage medium SM.

To prevent mutual sintering and/or coarsening of the grains of the active storage medium SM, an inert material IN is introduced into the storage structure, the inert material IN being in any desired form, for example in the form of grains of any size or else in the form of whisker-shaped particles (not shown).

The particles of the inert material IN are arranged both in an intragranular and in an intergranular manner in relation to the grains of the storage medium, and therefore within and/or between the grains of the storage medium SM. In this manner, the particles of the inert material IN, even after several oxidation and reduction cycles, can space apart the individual grains of the storage medium SM from one another, since no spread of the active storage medium SM through the inert material IN takes place even after several charging/discharging cycles. Nor does any chemical reaction take place between the inert material IN and the shuttle gas $H_2/H_2O$.

If the inert material IN is distributed in an intragranular manner in the storage material, what are called ODS (oxide dispersion-strengthened) particles of the storage material may be formed. For production of these ODS particles, iron particles are used and are mixed with coarse-grain zirconium dioxide $ZrO_2$, pressed dry and lightly sintered. Both the ceramic particles of inert material IN present in intragranular form in the storage material and a coarse-grained ceramic matrix of inert material IN (not shown) slow down coarsening of the storage medium SM. The ceramic-based inert material used to form the ceramic matrix at present is, for example, yttrium-stabilized zirconium dioxide, also referred to as YSZ, e.g., in a composition referred to as 8YSZ, having a concentration of 8 mol % of $Y_2O_3$ is $ZrO_2$.

Continued redox cycling in the solid electrolyte battery then leads, in combination with the high operating temperatures, to gradual coarsening of the active storage medium and hence to noticeable aging in the battery performance.

A further problem lies in the intrinsic oxidation mechanism of the storage metals used, which is based principally on cationic diffusion. This oxidation mechanism leads, especially in the discharging operation, to gradual migration of the storage medium in the direction of the $O^{2-}$ source, since the diffusion of the metal species into the reaction zone is faster than the corresponding transport of the oxygen species in the underlying oxidation process.

The resulting mass flow toward the oxidation source leads, together with the gradual coarsening and/or sintering of the reactive metal particles originally present, to a continuous change in the storage structure, which is reflected in increasingly poorer charging and discharging characteristics and in a decrease in the useful capacity.

The described use of inert material IN in the composition of the storage structure is able to slow down coarsening of the storage medium SM, but is unable to reverse it. More particularly, it is not possible at present to regenerate an aged storage structure.

Typical aging-related particle coarsening of the active storage medium is reversed by aiming to increase the active surface areas of the storage medium SM again or else to deagglomerate them. This deagglomeration assures regeneration of an aged storage structure.

For regeneration of the storage structure, use of a polymorphous inert material IN is employed, the inert material IN having at least one polymorphous phase transition within a temperature range that can be chosen to a substantial degree via technical measures. The temperature range may be within a range between room temperature and a maximum use temperature of the solid electrolyte battery.

The term "polymorphous" is understood to mean the property of a compound of being able to exist in several lattice structures each having different chemical and/or physical properties. Polymorphous materials thus differ by the three-dimensional arrangement of their lattice structures and thus have different properties. Different lattice structures can be established as a result of various outside influences, and in this context it is the influence of temperature which is of crucial interest. The phase transition is, in this context, a change in the lattice structure of the inert material IN because of a temperature change.

The polymorphous phase transition, via the change in lattice structure, also brings about a greater or lesser change in the specific volume of the inert material IN, which acts on the surrounding grains of the storage medium SM in the form of a mechanical tension. Mechanical coupling of the stresses triggered by the phase transition of the inert material IN causes the adjacent grains of the storage medium SM to break up, providing new reactive zones of the storage medium for the redox operation. Accordingly, a regenerative deagglomeration is achieved.

A polymorphous phase transition is established, for example, by virtue of a thermal cycle of the storage structure passing through the phase transition temperature. The mechanical stresses caused by the changed lattice structure and the associated change in volume of the inert material IN cause the storage structure to break up, providing new reactive zones for the redox operation in the charging or discharging process.

A temperature range for performance of the regeneration process is in principle in a range between room temperature and a maximum use temperature of the solid electrolyte battery. The process can thus be used either in a special regeneration operation outside a thermal operating range for normal storage operation or else within the thermal operating range of normal storage operation, which is also referred to as the intrinsic operating temperature band.

According to a configuration, the polymorphous phase transition temperature is within the intrinsic operating temperature band. During the discharging operation, the storage medium SM is oxidized, which is typically an exothermic operation and leads to heating of the solid electrolyte battery. By contrast, the reduction of the active storage medium SM is generally an endothermic process and leads to cooling of the solid electrolyte battery. The temperature window covered is typically 700-850° C., which thus constitutes the range for the polymorphous phase transition temperature of the inert matrix material IN.

According to an alternative configuration, lower transition temperatures down to room temperature are selected for the polymorphous phase transition temperature of the inert material IN. The surface area of the active storage medium SM is then increased by regenerative operation employing a controlled cooling and reheating operation of the solid electrolyte battery.

An example of an inert polymorphous matrix material used is zirconium dioxide, which is suitably doped with an element from the group of the rare earths (RE), for example according to the structural formula $ZrO_2$-$(RE)O_{1.5}$. Rare earth dopants, represented by "RE" as a placeholder in the structural formula, may be yttrium, neodymium, lanthanum, cerium and/or gadolinium, and combinations thereof.

Figure 3:
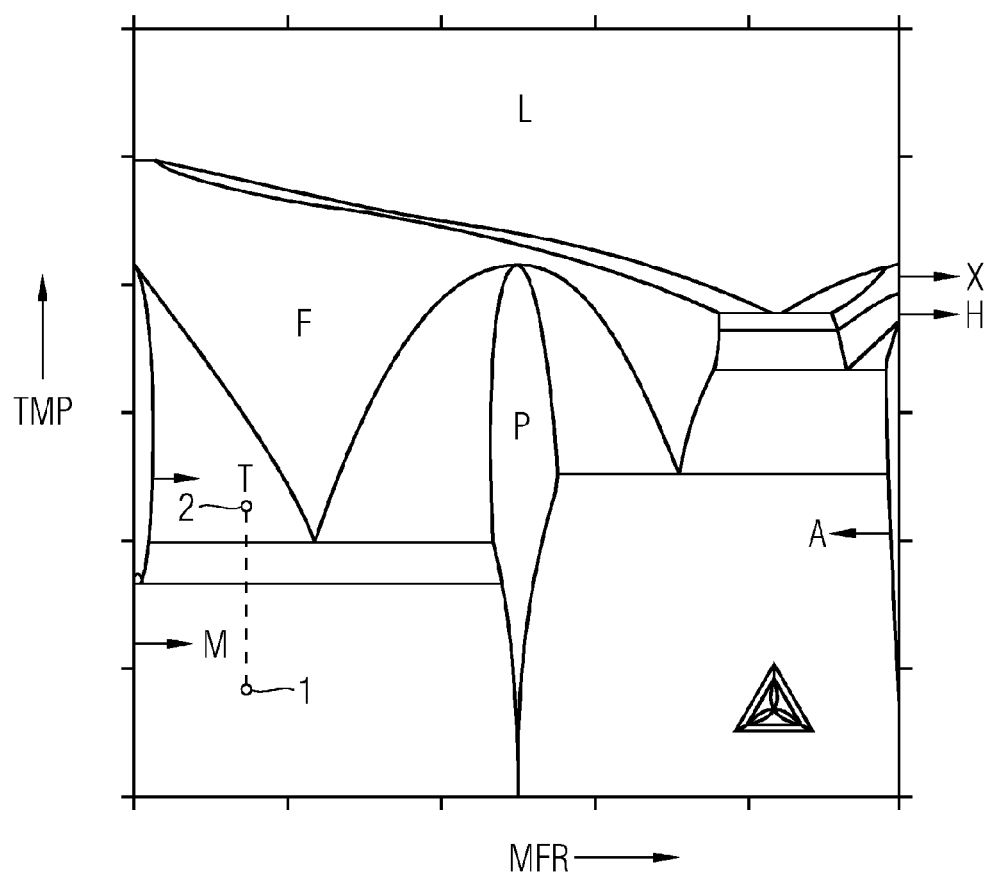
FIG. 3 is a phase diagram of an illustrative polymorphous inert material.

For further elucidation of the material properties utilized, FIG. 3 shows a phase diagram of an illustrative polymorphous inert material, using doping based on neodymium according to the structural formula $ZrO_2$—$NdO_{1.5}$ to illustrate the phase transitions. Plotted on the abscissa of the phase diagram is the molar proportion MFR of $NdO_{1.5}$ in relation to the pure undoped matrix material $ZrO_2$, which rises from 0% on the left-hand side of the phase diagram to 100% on the right-hand side of the abscissa of the phase diagram. Plotted on the ordinate of the phase diagram is the temperature TMP, with the temperatures TMP plotted rising from the bottom upward.

Drawn on the phase diagram is a dotted line between a first coordinate 1 and a second coordinate 2 which runs parallel to the ordinate and hence corresponds to a temperature rising between the first coordinate 1 and the second coordinate 2 at a given molar proportion MFR of $NdO_{1.5}$ in relation to the undoped matrix material $ZrO_2$. As can be seen in the phase diagram, the doped material runs here between the lower temperature TMP of the first coordinate 1 and the higher temperature TMP of the second coordinate 2 of a polymorphous phase transition, namely from a monoclinic phase M to a tetragonal phase T. In the reverse direction, corresponding to a lowering of the temperature TMP, the doped material undergoes a phase transition from a tetragonal phase T to a monoclinic phase.

The other phases F, P, L, A, X and H named in the drawing are not essential to the understanding of this phase transition under consideration, and are merely cited for the sake of completeness.

The phase transition from the monoclinic phase M to the tetragonal phase T has a displacing martensitic effect on the lattice structure of the doped inert material, leads to a considerable change in volume of the unit cell of several percent and is therefore particularly suitable for bringing about the mechanical stresses. When the doping in question is used in an inert material IN, these stresses cause the adjacent grains of the storage medium to break up, providing new reactive zones for the redox operation in the charging or discharging process.

The choice of a temperature range for performance of the regeneration process should be made on the basis of a thermal level of phase transitions as a function of a selected doping. The temperature range is in principle within a range between room temperature and a maximum use temperature of the solid electrolyte battery. Considerations have to be made for setting of the temperature for special regenerative operation above the intrinsic operating temperature band. An upper operating temperature limit for current solid electrolyte batteries nowadays is typically about 900° C. It is possible to operate the solid electrolyte battery temporarily in a temperature range exceeding the upper operating temperature limit up to the maximum use temperature of the solid electrolyte battery, in order to conduct temporary regenerative operation of the solid electrolyte battery, in which case the temporarily increased temperature range of the regenerative operation exceeds the nowadays customary upper operating temperature limit. In the individual case, a consideration has to be made as to whether the advantages of an elevated temperature range above the upper operating temperature limit which is to be established for regenerative operation outweigh the disadvantages of growth in thermal aging processes above the upper operating temperature limit. The maximum use temperature of the solid electrolyte battery, in the context of the aforesaid, is a parameter of a solid electrolyte battery which is not fixed in principle and arises solely from the technical consideration in the above sense.

What may be more technically viable is regenerative operation selected outside the thermal cycle of normal storage operation in a lower temperature range down to room temperature. In each case, if the temperature range for performance of the regeneration process is within the intrinsic operating temperature band of the solid electrolyte battery, the regeneration will take place within the normal temperature band of charging and discharging operation.

Through the choice of an inert material IN suitable in terms of the thermal level of its phase transitions, it is technically possible to establish a suitable temperature range on the basis of the inert material selected and on the basis of suitable doping. The choice of $ZrO_2$—$NdO_{1.5}$ as inert material IN has been found to be technically favorable, but is merely illustrative of a polymorphous inert material IN and has at least one polymorphous phase transition in the range between room temperature and the maximum use temperature of the solid electrolyte battery.

The polymorphous inert material IN may either be integrated in the active storage medium SM or may be present as a separate phase in the storage structure.

The total content of polymorphous inert material is advantageously less than 50 percent by volume.

According to one embodiment, the rare earth content, i.e. the molar proportion MFR of $(RE)O_{1.5}$ in relation to the undoped inert material $ZrO_2$, is less than 10%, or even less than 5%, since, in this case, the tetragonal-monoclinic phase transition of the $ZrO_2$ associated with a relative large change in volume is within the abovementioned advantageous operating temperature range.

The storage structure allows the creation of new reactive surfaces of the active storage medium. This results in a distinct reduction in the aging rate and a distinct improvement in the long-term stability of the storage medium.

The storage structure additionally allows upscalable, reproducible, flexible and inexpensive production of the storage medium and is applicable to various metal storage materials.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A storage structure for a solid electrolyte battery, comprising:
   a storage medium including a porous microstructure comprising particles forming a redox pair adjacent a negative electrode of the solid electrolyte battery; and
   an inert material arranged within or between grains of the storage medium, the inert material comprising a polymorphous inert material which has at least one polymorphous phase transition within a range between room temperature and a defined maximum use temperature of the solid electrolyte battery,
   wherein the at least one polymorphous phase transition causes a change in a lattice structure of the inert material breaking up adjacent grains of the storage medium to expose new reactive zones in the porous microstructure,
   wherein the polymorphous inert material comprises a rare earth-doped zirconium dioxide and wherein the dopant comprises a rare earth material selected from the group consisting of neodymium, lanthanum, cerium, and gadolinium.

2. The storage structure as claimed in claim 1, wherein at least one polymorphous phase transition temperature of the polymorphous inert material is within an intrinsic operating temperature band of the solid electrolyte battery.

3. The storage structure as claimed in claim 1, wherein a molar rare earth content of the rare earth-doped zirconium dioxide is less than 10 percent.

4. The storage structure as claimed in claim 3, wherein the molar rare earth content of the rare earth-doped zirconium dioxide is less than 5 percent.

5. The storage structure as claimed in claim 1, wherein the rare earth of the rare earth-doped zirconium dioxide comprises neodymium.

6. The storage structure as claimed claim 1, wherein a total proportion of the polymorphous inert material in the storage structure is below 50 percent by volume.

7. The storage structure as claimed in claim 1, wherein the polymorphous inert material is integrated within the storage medium.

8. The storage structure as claimed in claim 1, wherein the polymorphous inert material is a separate phase in the storage medium.

9. The storage structure as claimed in claim 1, wherein the storage medium is at least one material selected from the group consisting of iron, iron oxide, nickel, nickel oxide, tungsten and tungsten oxide.

* * * * *